United States Patent [19]

Raio

[11] Patent Number: 5,579,685
[45] Date of Patent: Dec. 3, 1996

[54] BREAKAWAY ENGAGEMENT MECHANISM

[75] Inventor: Steven M. Raio, Yorba Linda, Calif.

[73] Assignee: Insta Lettering Machine Company, Cerritos, Calif.

[21] Appl. No.: 393,546

[22] Filed: Feb. 23, 1995

[51] Int. Cl.⁶ ..................................................... B30B 15/28
[52] U.S. Cl. .......................... 100/53; 100/265; 100/269.2; 156/580; 403/229
[58] Field of Search ........................... 100/53, 93 P, 265, 100/268, 269.2; 156/580, 583.1; 403/145, 41, 220, 229

[56] References Cited

U.S. PATENT DOCUMENTS

| | | | |
|---|---|---|---|
| 975,204 | 11/1910 | Blanchard | 100/53 |
| 3,251,297 | 5/1966 | Kees | 100/53 |
| 3,567,560 | 3/1971 | Stiff | 100/93 P |
| 3,588,016 | 6/1971 | Reinhard et al. | 403/145 |
| 3,721,602 | 3/1973 | Bosse | 100/93 P |
| 4,741,642 | 5/1988 | Carlton | 403/229 |
| 5,080,011 | 1/1992 | Paxton et al. | 100/269.2 |

OTHER PUBLICATIONS

"Hot Dimensions from Insta" Brochure, Insta Graphic Systems, no date.
"Insta Machines–Put It On!" Brochure, Insta Graphic Systems, no date.

Primary Examiner—Stephen F. Gerrity
Attorney, Agent, or Firm—Stetina Brunda & Buyan

[57] ABSTRACT

A breakaway engagement mechanism is provided for use in connection with a press having a stationary first platen and a vertically translatable second platen, engagable to a vertically translatable drive cylinder mechanism. The engagement mechanism comprises a drive cylinder coupling shaft for engaging a drive cylinder mechanism and extending vertically therefrom. A second platen coupling member is mounted to the coupling shaft and engagable to the second platen. A spring member is further provided, having a first end connectable to the second platen, and a second end connectable to the coupling member, for resiliently holding the coupling member to the second platen.

9 Claims, 4 Drawing Sheets

BREAKAWAY ENGAGEMENT MECHANISM

FIELD OF THE INVENTION

The present invention relates to safety mechanisms for use to prevent injury in the operation of presses. More particularly, the preferred embodiment of the invention relates to a safety mechanism for use in preventing injury as a result of the vertical translation of a lower platen in a heat sealed device.

BACKGROUND OF THE INVENTION

Many different types of presses are currently in use. Presses may incorporate a stationary upper member and a vertically translatable lower member, or a stationary lower platen and a vertically translatable upper platen. Pressure, which may be considerable pressure, may be used to urge the lower platen vertically upward to the upper platen. In some applications heat may also be applied to one or more of the mating platen surfaces to effect a particular operation. Once the operation is concluded the pressure is typically relieved and the lower platen is allowed to return to its original position, spaced from the upper platen.

A variety of different types of safety hazards may exist in connection with the operation of presses. One concern relates to the possibility that a user or other observer may place a hand or other body member within the space between upper and lower platens. Many industrial machines accommodate such a potential hazard by inclusion of dual start switches, on the machine. In order for the lower platen to begin upward movement, the operator must almost simultaneously within less than 1 second of each other depress both start switches, which are spaced from each other sufficient to require two hand operation. Thus, the operator's hands are necessarily removed from the area intermediate the upper and lower platens as the machine begins to operate. While this technique is generally effective, operators have occasionally found ways to defeat the safety mechanisms, such as by taping one switch into an on position to allow the use of that hand to manipulate products between the platens while the second switch is being depressed.

Moreover, even where the dual start switches are properly used, they do not provide any safety benefit in the event that an observer intentionally or inadvertently reaches into the operating area after the start switches have been activated. Accordingly, there remains a need to develop a further safety mechanism for use in connection with presses, which operate independent of electronic control systems that can be defeated or ineffective under certain circumstances.

Another shortcoming of existing press safety techniques concerns the retraction, or downstroke, of the lower platen. While start switches are generally effective to avoid injury during the upstroke, they are commonly not useful to avoid injury during the downstroke, which may occur automatically when the operator's hands are removed from the start switches. Put otherwise, once the press cycle is initiated by depression of the start switches, the cycle may continue to completion, despite the fact that the switches are released. As a consequence, the operator may extend a hand or other body member within the area between the machine base and the lower platen, causing injury as the lower platen, causing injury as the lower platen lowers to its original position. While some lower platens are formed to be vertically separable from the drive mechanism, the close engagement of the two may result in a locking relationship when any obstruction causes tilting of the lower platen from its normal horizontal position. As a consequence, the lower platen may not in fact separate from the drive mechanism during the downstroke, which may result in compressing or crushing any body member caught between the lower platen and the machine base.

The present invention is directed to a mechanism which addresses these and other problems, providing significant safety enhancements to the operation of presses, which are independent of electronic control systems and are unlikely to be defeated.

SUMMARY OF THE INVENTION

A breakaway engagement mechanism is provided for use in connection with a press having a stationary top platen and a vertically translatable bottom platen, engagable to a vertically translatable drive cylinder mechanism. The engagement mechanism comprises a drive cylinder coupling shaft for engaging a drive cylinder mechanism and extending vertically therefrom. A second platen coupling member is mounted to the coupling shaft and engagable to the second platen. A spring member is further provided, having a first end connectable to the second platen, and a second end connectable to the coupling member, for resiliently holding the coupling member to the second platen.

In the presently preferred embodiment the coupling shaft of the engagement mechanism is formed to have at least one vertically extending slot formed therein for engaging the drive cylinder mechanism.

In the presently preferred embodiment the second platen coupling member is rigidly secured to the coupling shaft.

In the presently preferred embodiment a plurality of set screws are provided vertically extending from the second platen, engagable with a plurality of recesses formed in the second platen coupling member, for receiving the set screws. The recesses are preferable formed to permit vertical translation of the set screws within the recesses as the second platen is tilted from its normal horizontal position. The recesses are preferably formed to be U-shaped, such that the second platen is tiltable in the direction of the open portion of the recesses.

The distance between pairs of recesses is preferably less than the distance between corresponding pairs of set screws, to allow the coupling member to travel horizontally while the set screws are within the recesses, and to facilitate tilting of the second platen.

In the presently preferred embodiment a pair of slots are formed within the coupling shaft and an attachment pin extends between the slots for engaging the spring member second portion.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps of constructing and operating the invention in connection with the illustrated embodiments. It is understood, however, that the same or equivalent functions and sequences may be accomplished by different embodiments that are also intended to be encompassed within the spirit and scope of the invention.

Figures 1, 2:
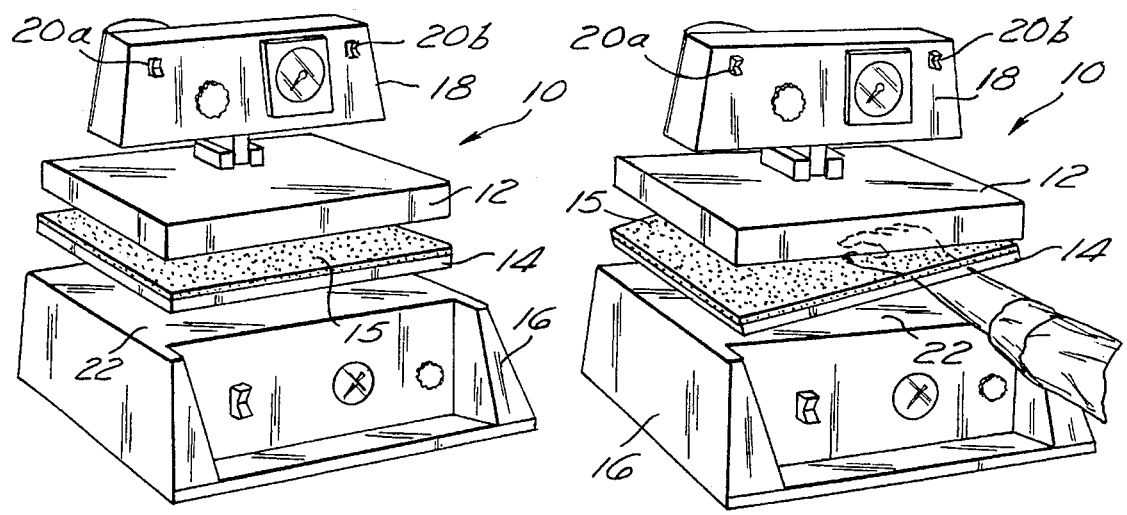
FIG. 1 is a front perspective view of a press suitable for incorporating the present invention.
FIG. 2 is a front perspective view in accordance with FIG. 1, further showing movement of the lower platen as permitted by the present invention.

FIG. 1 illustrates an exemplary press in which the present invention may find common application. The exemplary press 10 includes upper platen 12 and lower platen 14. The upper platen 12 is typically stationary, while the lower platen 14 is adapted for vertical movement from a position substantially adjacent base 16 to a position adjacent upper platen 12.

Switches 20a, 20b typically utilized to serve as tie-down switches, to avoid injury as the lower platen 14 moves upward into engagement with upper platen 12. The circuitry associated with switches 20a, 20b, typically requires that both switches 20a, 20b be substantially simultaneously pressed before lower platen 14 begins its upward travel, thereby deterring possible injury by intentional or unintentional placement of the hand or other article intermediate upper platen 12 and lower platen 14.

While the inclusion of start or tie-down switches 20a, 20b is generally useful to avoid injury on the upstroke of lower platen 14, they are commonly ineffective to avoid injury on the downstroke. Once the switches 20a, 20b are activated, cycling of lower platen 14 begins, and typically continues, notwithstanding subsequent release of switches 20a, 20b. Moreover, even where switches 20a, 20b must be continuously held, there is a potential hazard where the switches are defeated, overrode, or where an observer causes a potential hazard despite proper operation. Accordingly, it is imperative, for safety considerations, a system be designed to have safety characteristics which are independent of any assumptions regarding proper operation. Accordingly, FIG. 2 illustrates the implementation of the present invention in a press, such that safety is enhanced independent of any electronic controls or assumptions regarding operator precautions. Indeed, as illustrated in FIG. 2, the present invention provides a level of safety against intentional or inadvertent insertion of a hand or other member within the field of motion of the lower platen 14. Shown in FIG. 2, the present invention operates to allow the lower platen 14 to become horizontally offset in the event that a hand or other obstruction is interposed between the lower platen 14 and the upper surface 22 of base 16. It should be understood that the invention also operates to horizontally offset the lower platen 14 when a hand or other obstruction is interposed on the opposite side of lower platen 14, i.e., between lower platen 14 and upper platen 12.

Figure 3:
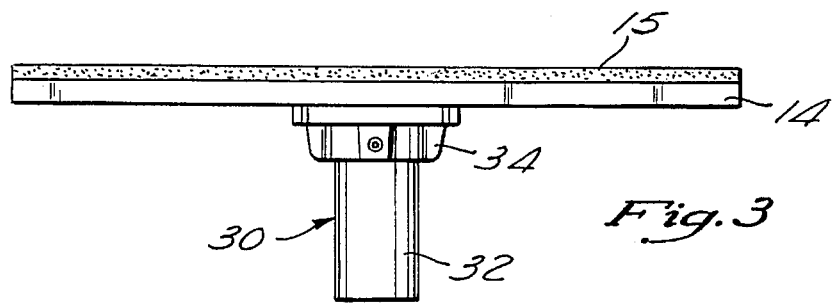
FIG. 3 is a front view of a breakaway engagement mechanism in accordance with the present invention, as connected to a lower platen.

FIG. 3 provides a front view of the present invention in combination with lower platen 14. As shown therein the breakaway engagement mechanism 30 incorporates a drive cylinder coupling shaft 32 and a lower platen coupling member, or stem 34. The drive cylinder coupling shaft 32 extends downwardly from the lower platen 14 to engage a reciprocating drive cylinder disposed within the base 16 of the press 10. As described in more detail below, lower platen coupling member 34 engages the lower platen 14 to the drive cylinder coupling shaft 32. As will be apparent to those skilled in the art, the breakaway engagement mechanism 30 may be implemented in a variety of different constructions, all within the scope of the present invention. The presently preferred embodiment of the breakaway engagement mechanism 30 is described in more detail below.

Figure 4:
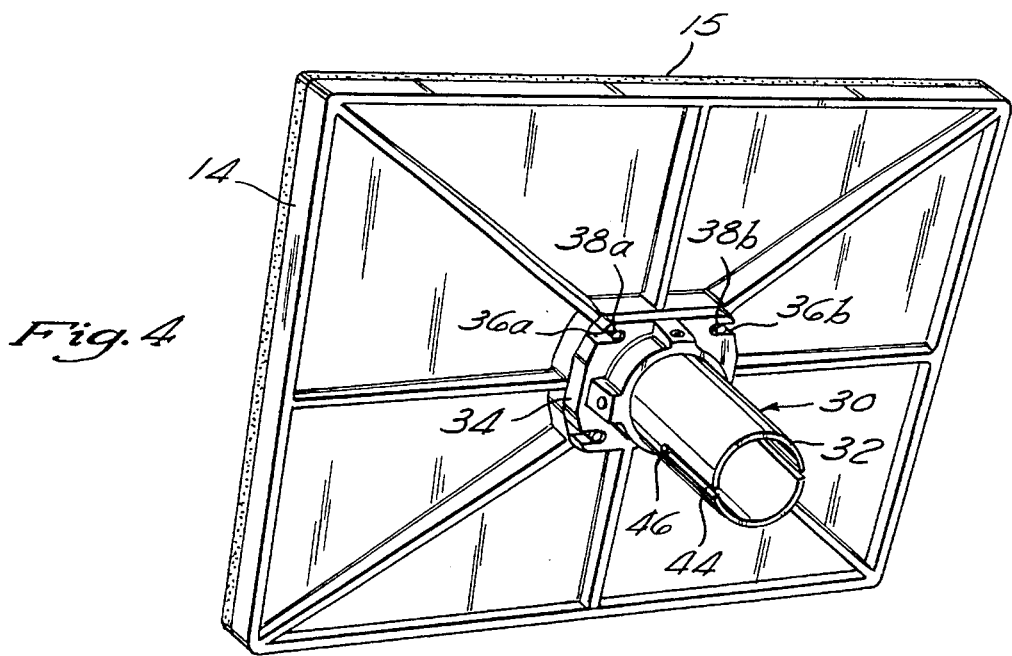
FIG. 4 is a bottom perspective view of the invention as shown in FIG. 3.

FIG. 4 provides a bottom perspective view of the breakaway engagement mechanism 30, coupled to the lower platen 14. As shown therein the drive cylinder coupling shaft 32 is formed as a slotted shaft which extends into the lower platen coupling member 34. In turn, the lower platen coupling member 34 is maintained in position against the lower platen 14 by engagement of set screws, e.g., 36a, 36b, within recesses 38a, 38b respectively. As described in more detail below, the lower platen coupling member 34 is adapted for travel with respect to the set screws 36a, 36b, to allow for separation of the breakaway engagement mechanism 30 from the lower platen 14, as the lower platen 14 encounters an obstruction in it during its travel.

Figure 5:
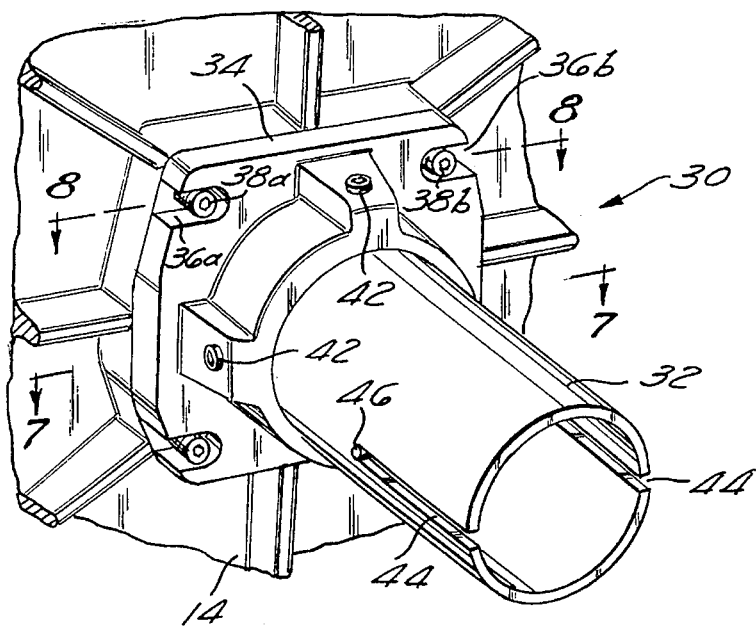
FIG. 5 is an enlarged perspective view of the invention as shown in FIG. 4.

FIG. 5 provides greater detail of the construction of the breakaway engagement mechanism 30. As shown therein the drive cylinder coupling shaft 32 is provided with a slot 44 extending axially along the length of the drive cylinder coupling shaft 32. Slot 44 further facilitates engagement of the drive cylinder coupling shaft 32 to the drive cylinder mechanism disposed with base 16. Set screw 42 is provided to maintain the drive cylinder coupling shaft 32 in engagement with the lower platen coupling member 34. As described in more detail in connection with FIGS. 6, 7 and 8, the drive cylinder coupling shaft 32 may extend through the lower platen coupling member 34 to be seated within a recess 50, formed within the lower platen 14. As is also shown in FIG. 5, spacing between set screws 38a, 38b, is greater than spacing between proximate portions of recesses 36a, 36b. Consequently, the lower platen coupling member 34 is adapted for horizontal travel while remaining engaged to lower platen 14, thereby facilitating counter lever movement of the lower platen coupling member 34, with respect to the lower platen 14.

Figure 6:
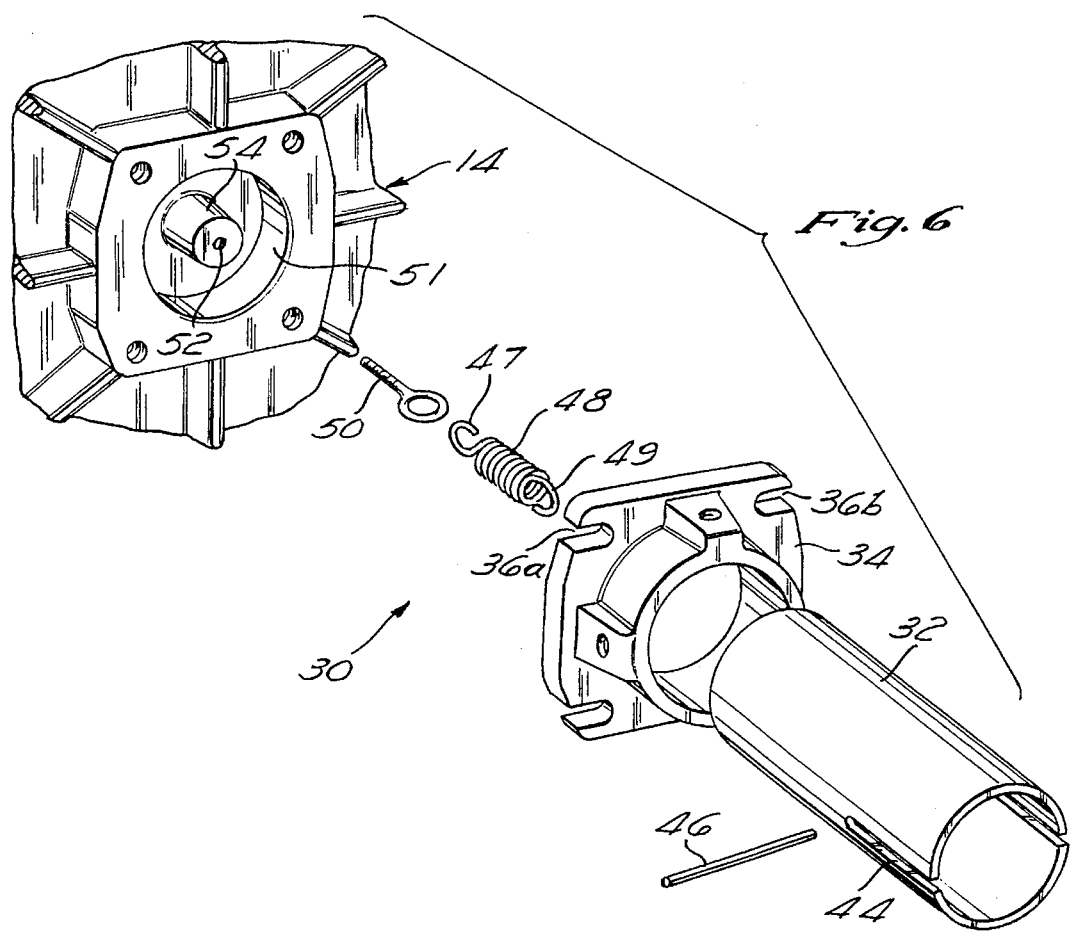
FIG. 6 is an exploded perspective view of the invention as shown in FIG. 5.

FIG. 6 provides further detail of the breakaway engagement mechanism 30, including resilient coupling of the breakaway engagement mechanism 30 to the lower platen 14. As shown in FIG. 6, the breakaway engagement mechanism 30 is provided with a pin 46 which fits within and is secured by the recess 44 formed in the drive cylinder coupling shaft 32. Spring 48 has a first end 47 engagable with pin 46, and a second end engagable with eye screw 50. Spring 48 has a first end 47 connectable to lower platen 14, and a second end 49 connectable to pin 46. Eye bolt 50 in turn is engagable within recess 52 formed within protrusion 54. As a collective unit, pin 46, spring 48 and eye bolt 50 provide resilient engagement of the lower platen coupling member 34 to the lower platen 14. The pin 46, spring 48 and eye bolt 50 allow the lower platen coupling member 34 to resiliently separate from the lower platen 14 in the direction of the open end of the grooves 36a, 36b. The pin 46 may be constructed to have relieved portions at the ends for secure engagement within recess 44, in a central relieved portion for receiving spring 48 and holding it laterally in place.

It will be understood by those skilled in the art that various other mechanisms may be implemented for resiliently connecting the lower platen coupling member 34 to the lower platen 14. The particular arrangement of pin 46, spring 48 and eye bolt 50 is therefor intended as an exemplary construction, representative of the presently preferred embodiment of implementing the invention.

Figure 7:
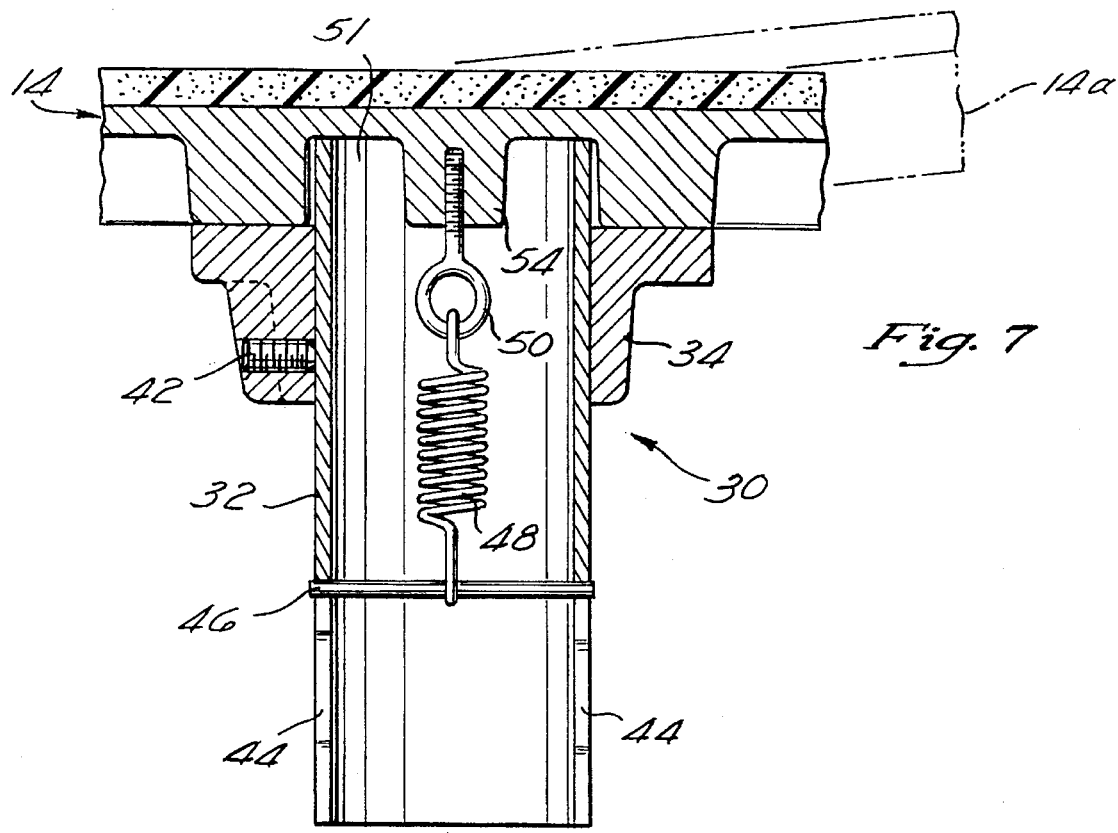
FIG. 7 is a sectional view of the invention as shown in FIG. 5, taken along lines 7—7.

FIG. 7 provides a further illustration of the method for coupling the breakaway engagement mechanism 30 to the lower platen 14. The figure also illustrates alternate position of lower platen 14, indicated as 14a, as the lower platen 14 encounters an obstruction in the course of its downward travel.

As shown in FIG. 7 the drive cylinder coupling shaft 32 extends vertically through the lower platen coupling member 34 into well 51, formed in lower platen 14. Drive cylinder coupling shaft 32 is preferably formed to have a diameter, while fitting within well 51, leaves sufficient space within well 51 to accommodate counter lever movement of lower platen 14 with respect to drive cylinder coupling shaft 32. Such movement is shown in more detail in connection with FIG. 8. Set screw 42, also shown at FIG. 5 serves to securely engage drive cylinder coupling shaft 32 to lower platen coupling member 34. In practice the set screws 42 may be alternatively implemented as threaded pins or other locating devices, as would be readily apparent to those of ordinary skill in the art.

Figure 8:
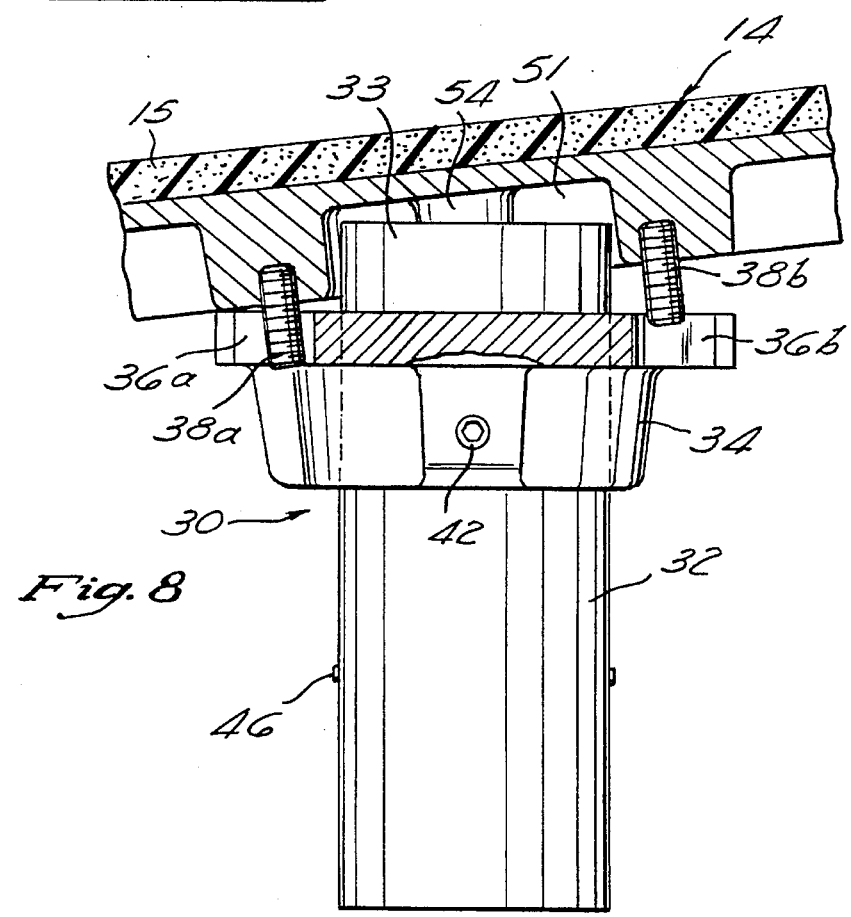
FIG. 8 is a sectional view of the invention as shown in FIG. 5, taken along lines 8—8, and further illustrating operation of the invention.

FIG. 8 provides further illustration of the movement of the lower platen 14 with respect to the upper portion 33 of drive cylinder coupling shaft 32, and with respect to the lower platen coupling member 34. As shown therein the lower platen 14, along with set screws 38a, 38b are adapted for separation from the breakaway engagement mechanism 30 as the lower platen 14 encounters an obstruction in the course of its downward travel, the adjacent portion of lower platen 14 becomes elevated with respect to the breakaway engagement mechanism 30, subject to being restored to its original position as a consequence of the collective operation of pin 46, spring 48 and eye bolt 50.

Figure 9:
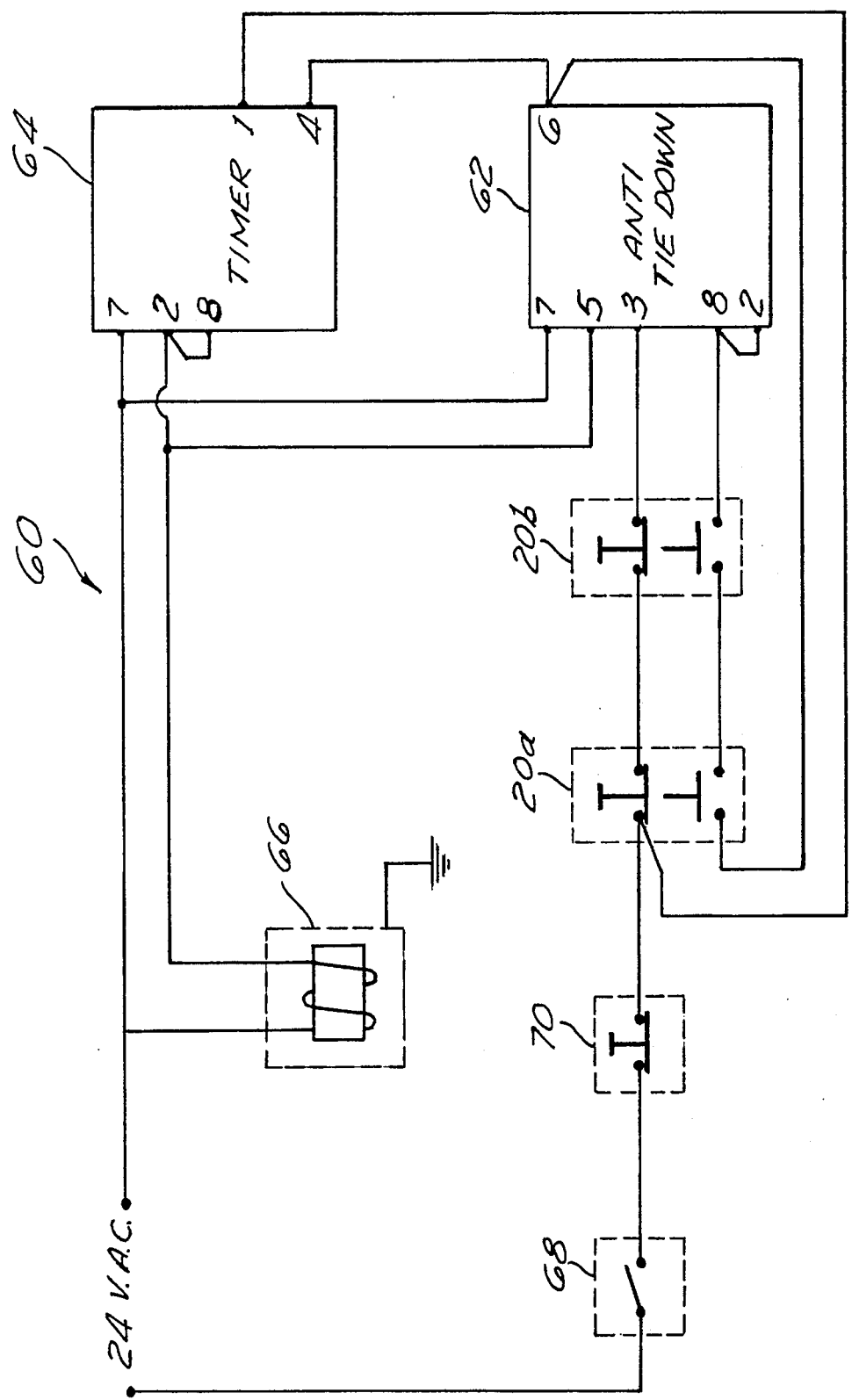
FIG. 9 is a circuit diagram illustrating operation of the anti-tie-down device.

FIG. 9 provides a circuit diagram 60 illustrating operation of the anti-tie-down device which serves as a safety feature of the press operation. In general the circuit 60 requires that both start switches 20a, 20b (also shown in FIG. 1) be pressed within 3/10 second window of time. This requires a press operator to have both hands on the start switches in order to start the press operation. If one or both switches are tied down, the anti-tie-down device will not allow the press to operate.

In practice, the anti-tie-down control 62 may be implemented as an anti-tie-down control switch, part no. MPPA701, sold by Nolotron Corporation. Timer 64 may be implemented as the model LX260P9 timer sold by Eagle Signal Controls, of Austin, Tex. Also included within circuit 60 are solenoid 66 operative to initiate translation of the press, position sensing switch 68, and emergency stop switch 70. The switching circuitry within timer 64 closes after the pinch point of the press has passed. Circuit 60 further operates in such a manner that, in the event of a failure of the anti-tie-down controller 62, or timer 64, the press will not operate.

As indicated above, the invention of the present invention similarly operates to horizontally displace lower platen 14 in the event a hand or other obstruction is interposed intermediate the upper platen 12 and lower platen 14. Similarly, the broader aspects of the present invention may be implemented with respect to both upper and/or lower platens. Moreover, the particular mechanism for implementing the functions of the present invention may be modified in accordance with the particular construction of the press or other device with which the invention is to be implemented, without departing from the broader aspects of the invention.

What is claimed is:

1. A break-away engagement mechanism for use in a press having a stationary first platen and a vertically translatable second platen engagable to a vertically translatable drive cylinder mechanism for regulating translation of the second platen, the engagement mechanism comprising:

a drive cylinder coupling shaft engagable to the drive cylinder mechanism to extend vertically from the second platen;

a second-platen coupling member mountable to the coupling shaft and engagable to the second platen; and a spring member having a first end connectable to the second platen and a second end connectable to the second-platen coupling member for resiliently holding the coupling member to the second platen.

2. The engagement mechanism as recited in claim 1 wherein the coupling shaft has at least one vertically extending slot formed therein for engaging the drive cylinder mechanism.

3. The engagement mechanism as recited in claim 1 wherein the second-platen coupling member is rigidly secured to the coupling shaft.

4. The engagement mechanism as recited in claim 1 further comprising:

a plurality of recesses formed in the second-platen coupling member for receiving a plurality of set screws vertically extending from the second platen.

5. The engagement mechanism as recited in claim 4 wherein the recesses are formed to permit vertical translation of set screws within the recesses.

6. The engagement mechanism as recited in claim 5 wherein the recesses are formed to be U-shaped.

7. The engagement mechanism as recited in claim 5 wherein the distance between pairs of recesses is less than the distance between corresponding pairs of set screws receivable therein to allow the coupling member to travel horizontally while set screws therefrom are within the recesses.

8. The engagement mechanism as recited in claim 1 wherein the spring member is extendable perpendicular to the second platen.

9. The engagement mechanism as recited in claim 1 further comprising:

a pair of slots formed in the coupling shaft; and an attachment pin extending between said slots for engaging the second end of the spring member.

* * * * *